V. Z. CARACRISTI AND A. F. WALLBILLICH.
VALVE CUT-OFF AND SPEED INDICATOR FOR LOCOMOTIVES.
APPLICATION FILED SEPT. 30, 1920.

1,422,832.
Patented July 18, 1922.

Inventors
Virginius Z. Caracristi and
Anthony F. Wallbillich,
By their Attorney
C. P. Goepel.

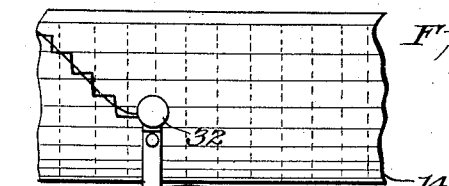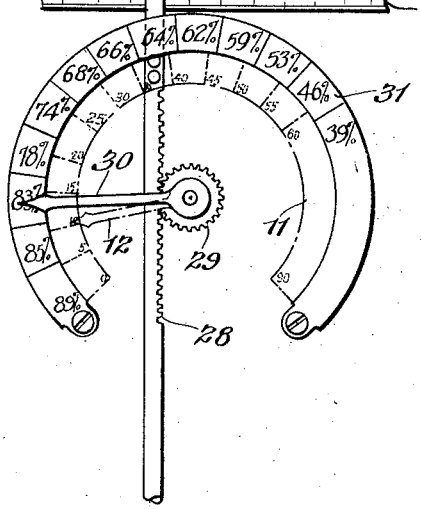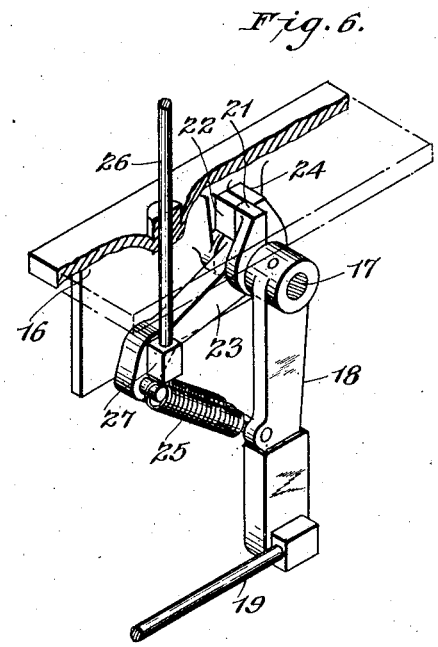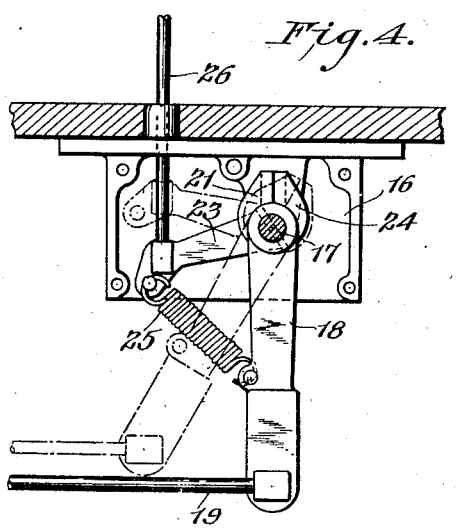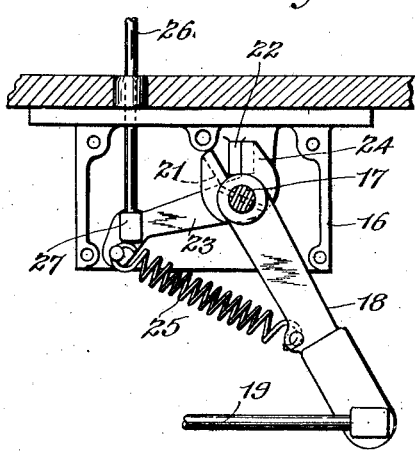

UNITED STATES PATENT OFFICE.

VIRGINIUS Z. CARACRISTI, OF BRONXVILLE, NEW YORK, AND ANTHONY F. WALLBILLICH, OF NEWARK, NEW JERSEY.

VALVE CUT-OFF AND SPEED INDICATOR FOR LOCOMOTIVES.

1,422,832.  Specification of Letters Patent.  Patented July 18, 1922.

Application filed September 30, 1920. Serial No. 413,765.

*To all whom it may concern:*

Be it known that we, VIRGINIUS Z. CARACRISTI, a citizen of the United States, and resident of Bronxville, in the county of Westchester and State of New York, and ANTHONY F. WALLBILLICH, of Newark, in the county of Essex and State of New Jersey, have invented certain new and useful Improvements in Valve Cut-Offs and Speed Indicators for Locomotives, of which the following is a description.

This invention relates to an improved valve cut-off operating mechanism and more particularly to means operatively correlated with a speed indicator for correcting the position of the cut-off valve in accordance with the piston stroke and speed of the engine in order to thereby maintain a predetermined ratio between the piston speed and point of cut-off.

More particularly, the present invention contemplates the provision of a mechanism readily adaptable to use in connection with the cut-off valve gear now in general use on locomotives, in combination with a speed indicator or recorder, such for instance as that shown in the patent granted to Thomas J. Barrett, No. 1,277,359, September 3, 1918. In this indicator there is provided a marker movable over a graduated tape and operatively controlled by suitable mechanism from one of the drive axles of the locomotive whereby a permanent graphic method of the speed of travel of the locomotive is produced. In conjunction with this graphic speed record there is also provided an indicating scale with a hand or pointer movable thereover to give a visual indication of the speed of travel at any time. In conjunction with this speed indicator scale, we propose to provide a second scale graduated in sections or areas indicative of degrees of valve cut-off which are properly correlated with the engine speed indications. A second hand or pointer is movable over the valve cut-off scale and actuating means therefor is operatively connected to the cut-off valve operating mechanism. Thus as the speed of the engine increases, the reverse lever is actuated to correspondingly position the cut-off valve, which position is indicated on the valve cut-off scale by the movement of the hand or pointer which should at all times be positioned in that section of the valve cut-off scale corresponding to the correlated graduated section of the speed indicating scale. Simultaneously with the operation of the valve cut-off indicating hand, a marker is moved upon the graduated tape to provide a graphic indication of the changes in valve cut-off position which will accurately follow the speed curve line. Thus there is afforded a permanent record whereby a check may be kept upon the engineer to disclose whether or not he has properly operated the cut-off valve in accordance with variations in speed and thus operated the engine in the most economical and efficient manner.

In one embodiment of our invention we propose to provide operating connections between the cut-off valve indicating hand and marker and the tumbling shaft of the valve gear so that the indicating means will be actuated only in a movement of the reverse lever to drive the engine forwardly and will not be actuated upon a movement of the reverse lever to drive the engine rearwardly.

In general the present invention comprehends the provision of a practical and satisfactory means for utilizing the method or principle of accurately controlling the valve cut-off position in accordance with speed variations, as described and claimed in the pending application of Virginius Z. Caracristi, filed May 29, 1920, Ser. No. 384,854.

With the above and other objects in view, the invention consists in the improved combination and arrangements of the several cooperating parts as will be hereinafter more fully set forth, illustrated in the accompanying drawings and subsequently incorporated in the subjoined claims.

In the drawings wherein we have illustrated one practical embodiment of the invention whereby the purposes of the present invention may be successfully accomplished and in which similar reference characters designate corresponding parts throughout the several views:

Figure 3 is a detail elevation showing the relationship of the valve cut-off and speed indicating scales and the actuating means for the valve cut-off marker and hand or pointer.

Figure 4 is a detail sectional view showing the operating connections between the tumbling shaft, the reverse lever and the valve cut-off indicating means, the several parts being shown in full lines in their normal positions and in dotted lines indicating an open position of the cut-off valve.

Figure 5 is a similar view, the actuating lever for the tumbling shaft being shown in position for the reverse or backward movement of the locomotive.

Figure 6 is a perspective view of the parts shown in Figure 4.

Figure 7 is semi-diagrammatic perspective view of the operating connections between the reverse lever, the tumbling shaft and the indicator.

Figure 9 is a detail view illustrating a slightly modified construction.

Figure 1:
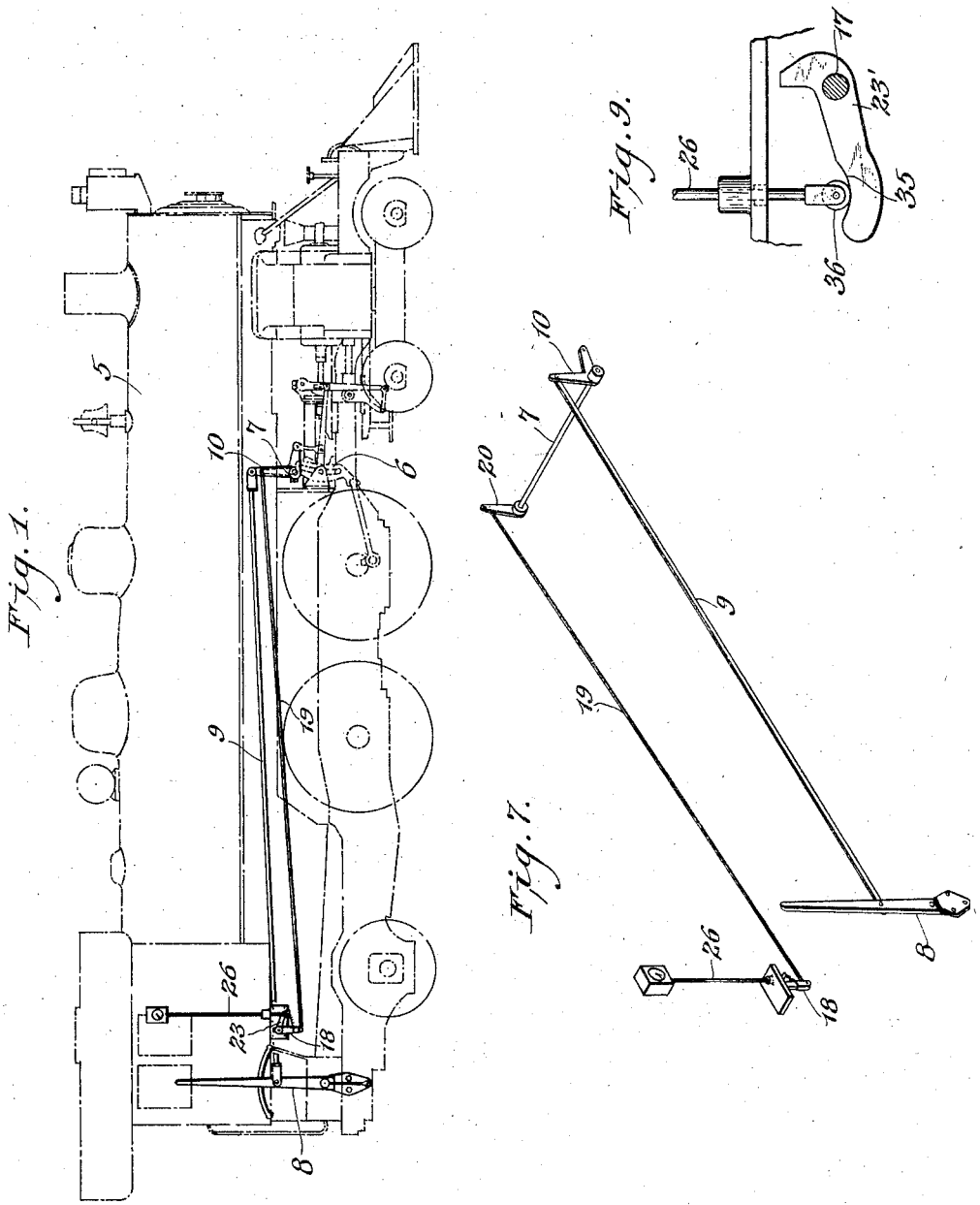
Figure 1 is a side elevation in dotted outline of a locomotive and valve gear thereof, the reverse lever and the primary parts of our present invention being shown in full lines.

Referring in detail to the drawings, 6 generally indicates a locomotive having the usual valve gear 6, primarily actuated from a transversely extending tumbling or rock shaft 7, suitably journaled in the supporting frame of the locomotive boiler; 8 designates the reverse lever which is mounted and arranged in the usual manner at the right hand side of the engineer's cab. This lever is operatively connected by means of the rod 9 through the medium of the bell crank 10 to the tumbling shaft 7.

At the left hand side of the engineer's cab a distance and speed indicating mechanism is mounted. This mechanism is herein shown as more or less similar to the patented indicator above referred to. For the purposes of the present explanation, it will suffice to state that this indicator as hertofore produced is equipped with a speed indicating scale, 11, over which a hand or pointer, 12, moves, the said hand being actuated by suitable rack and pinion mechanism, which is operatively geared to one of the drive axles of the locomotive. A marker 13 is operatively co-ordinated with the speed indicating pointer and produces upon a movable graduated tape 14 a graphic representation in the form of a series of waves, the shape and extent of which is indicative of the speed of travel of the locomotive at all times throughout the period of use of the instrument. In addition to this marker, 13, the instrument is equipped with a marker 15 which describes upon the graduated surface of the travelling tape 14 a second curved line which exactly corresponds with the positions assumed by the index hand or pointer 12 with reference to scale 11. This curve constitutes an accurate permanent record of the speed of the vehicle and is indicative of what was seen or should have been seen by the operator upon reference to the position of the index hand or pointer 12 upon the scale 11. It will be understood that our present invention may be employed either with or without a marker 13, and that the present improvement is not necessarily limited in its utility to an indicator of this particular type, though for practical reasons of efficiency and accuracy in operation, an indicator of the type referred to is preferred.

In the practical application of our present improvements, we secure to the underside of the floor of the locomotive cab the box or housing 16 in the opposite side walls of which the ends of a shaft 17 are journaled. The lower end of this housing is open and the lever 18 is securely pinned or otherwise fixed at one of its ends upon the shaft 17. This lever projects below the housing 16 and is connected by means of the rod 19 to an upwardly projecting arm 20 which is fixed upon the left hand end of the tumbling shaft 7. At its other upper end the lever 18 is formed with a transversely projecting lug 21, which in the normal position of said lever seen in full lines in Figure 4, is disposed in alignment with a lug 22 projecting from one side wall of the housing 16.

Upon the shaft 17 an arm 23 is loosely mounted at one of its ends and this end of said arm is likewise formed with an upwardly and laterly projecting lug 24, which normally bears against one side of the lug 22. It will also be noted from reference to Figure 6 of the drawings that in the normal position of the parts the lug 21 on the lever 18 is in contact with one side of the lug 24 on arm 23. This arm 23 at its other or free end is connected to the lever 18 by one or more contractible springs 25, which normally act to yieldingly hold the loosely mounted arm 23 with its lug 24 in contact with the stop lug 22 in the housing wall.

A rod 26 extends vertically upward through a guide boss on the top wall of the housing 16 and the lower end of this rod has a swivel connection 27 with the free end of the arm 23. The upper end of the rod 26 is connected to the lower end of a rack 28 extending vertically through the casing of the speed indicator mechanism. The teeth of this rack are in constant meshing engagement with the teeth of the pinion 29 fixed upon the shaft of a second index hand or pointer 30. This index hand or pointer is movable over the graduated surface of a second scale 31 arranged in concentric relation to the scale 11, the said scale 31 having sections or areas indicative of different degrees of valve cut-off. The upper end of the rack 28 extending above the indicator casing is equipped with a marker 32 which is also movable across the graduated tape 14.

Figure 2:
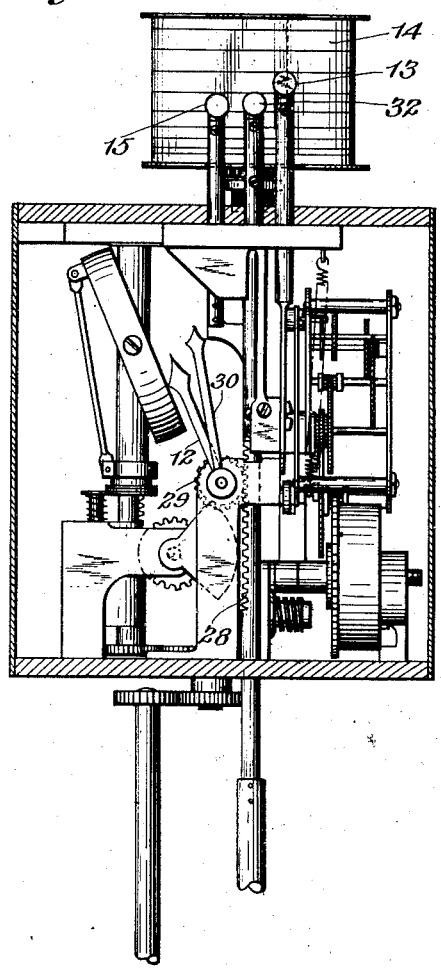
Figure 2 is a view of a speed indicating mechanism with the casing in section, illustrating the application of our valve cut-off position indicator in connection therewith.

In the operation of the mechanism as above described, assuming that the locomotive is at a standstill and the several parts are in their normal positions seen in full lines in Figures 4 and 6 of the drawings, as the cut-off valve is actuated by a forward movement of the reverse lever 8 and the locomotive gathers speed, the index hand or pointer 12 moves over the surface of the scale 11 and simultaneously a speed indicating curve is drawn by the pointer 15 on the tape 14. Assuming that this speed is 10 miles per hour as indicated in Figure 3, then the cut-off should be 83% of the piston stroke. If the pointer 30 is not positioned in the section of the scale 31 indicated by the position of the index pointer 12 on the scale 11, the engineer will understand that an insufficient quantity of steam is being admitted to the engine cylinders to maintain this speed, or, on the other hand, that the volume of steam being consumed is greater than that which is necessary to maintain the desired operating efficiency. He therefore operates the reverse lever to open or close the valve cut-off accordingly, and, until the pointer 30 occupies the same relative position on the gradations of the scale 31 as the pointer 12 occupies on the gradations of the speed indicating scale 11. In this forward movement of the reverse lever whereby the cut-off valve position is changed as the driving speed increases, the rack 28 is moved upwardly, and in Figure 4 we have shown in dotted lines the manner in which this movement is effected through the medium of the lever 18 and arm 23. From reference to Figure 6 it will be seen that since the lug 21 on lever 18 is in contact with lug 24 on the arm 23, when the lever 18 is moved in the direction indicated by the dotted lines in Figure 4, the arm 23 is moved upwardly to a corresponding extent. When, however, the reverse lever is moved in the opposite direction so that the cut-off valve is positioned for a backward propulsion of the locomotive the lever 18 is moved to the position seen in Figure 5, while the arm 23 remains stationary in its normal position with the lug 24 abutting against the stop lug 22 while the lug 18 on the lever may move freely with respect to said stop lug. Thus it is apparent that the cut-off valve position indicating means will not be actuated. In such relative movement of the lever 18, the springs 25 are of course under tension and upon a return of the reverse lever to its neutral position, these springs will contract. When expanded the springs 25 operate to hold the arm 23 absolutely stationary during the reverse or backward movement of the engine. However, we may, if desired, position the arm 23 on the opposite side of the shaft 17 to the position indicated in Figure 4 so that this arm will be moved downwardly instead of upwardly in the forward propulsion of the locomotive, and in Figure 2 of the drawings we have shown the rack 28 operatively related to the pinion 29 in such a proposed alternative arrangement. Preferably, the index hands or pointers 12 and 30 as well as the scales 11 and 31 will be distinctively colored so as to facilitate the easy differentiation of the respective scales.

Figure 8:
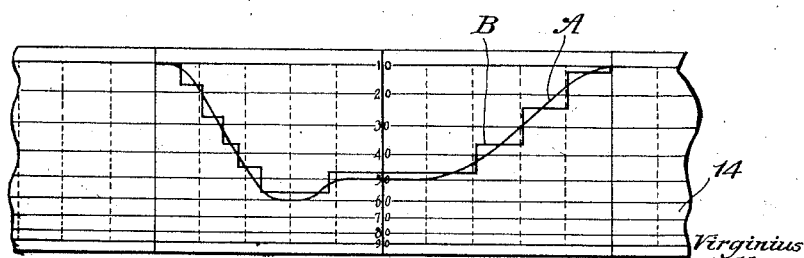
Figure 8 is an elevation of a fragment of the graduated tape showing the graphic representation of speed variations and valve cut-off position produced thereon.

Referring now to Figure 8 of the drawings "A" designates the speed curve line marked upon the travelling tape 14 by the marker 15 while "B" indicates the line produced by the marker 32 which is indicative of the various valve cut-off positions. It will be noted that this line is in the form of a series of angular steps closely following the speed curve line A each vertical break or step in the line B denoting a change in the valve cut-off position. If this line B closely follows the speedline A, it conclusively demonstrates that the engineer properly actuated the cut-off valve through the run of the locomotive so that the engine was actuated at the highest degree of efficiency for the varying driving speeds. In this manner a permanent record is produced which constitutes a check upon the engineer and will invariably disclose whether or not the engineer was negligent or on the other hand attentive to the proper performance of his duties.

For various reasons, the extent of valve cut-off may not always be in direct proportion to the movement of the valve gear. In such cases we propose to use the operating arm 23' shown in Figure 9 of the drawings in lieu of the arm 23 previously referred to and to change the operating rod 26 for the indicator mechanism as a pivotal connection. The arm 23' is provided at its end with a cam face 35 and upon the lower end of the rod 26 a roller 36 is journaled and travels freely upon the cam face 35. Thus in the operation of the valve gear through the reverse lever connections, it will be apparent that there will be a slight dwell in the perpendicular movement of the rod 26 as it rides over the cam face 35, and the indicator mechanism will thus be operated to accurately indicate the position of valve cut-off. Of course, interchangeable operating arms for the rod 26 may be provided having cams of different form or curvature and the proper cam selected for the operation of the indicator mechanism, in accordance with the predetermined difference in the valve gear movement and the movement of the cut-off valve.

From the foregoing, it will be seen that we have devised a very simple and efficient valve cut-off indicating means and operating connections therefor to the reverse lever which can be readily adapted for use in conjunction with pre-existing speed indicating instruments without necessitating any radical alterations in the construction of the latter. By means of such addition to the ordinary speed indicator, the engineer is at all times and instantly, made aware of any necessary change in the position of the cut-off valve controlling the admission of steam to the engine cylinders whereby the consumption of the steam may be reduced to a minimum at different driving speeds, thus resulting in the economical operation of the locomotive.

While we have herein illustrated and described one practical and satisfactory embodiment of the operating connections for the valve cut-off position indicating means, it is apparent that numerous alternative arrangements might be adopted. Accordingly we deserve the privilege of incorporating all such legitimate modifications in the form, proportion and relative arrangements of the several parts as may be fairly adapted within the spirit and scope of the appended claims.

We claim:

1. In combination with a speed indicator for vehicles and actuating means for the propulsion medium-controlling valve of the vehicle, said valve being movable in opposite directions from a neutral position for the forward and reverse movements of the vehicle; a second indicative means correlated with said speed indicator, means operatively connecting said second indicative means with the valve actuating means to operate the said second indicative means, upon a movement of the valve in one direction from its neutral position to propel the vehicle forwardly, to an extent determined by the speed indicator, whereby the valve is correctly positioned for the propulsion of the vehicle at a desired speed, said connecting means permitting of the movement of said valve in a reverse direction from its neutral position without effecting the operation of said indicative means.

2. In combination with a speed indicator for locomotives and actuating means for the cut-off valve of the locomotive including a reverse lever; a second indicative means correlated with said speed indicator, actuating means for said latter indicative means, and means operatively connecting said actuating means to the reverse lever and effective in the movement of said lever to shift the cut-off valve in one direction from its neutral position to thereby operate said second indicative means to an extent determined by the speed indicator, whereby the cut-off valve is positioned for the propulsion of the vehicle at a desired speed, said operating connection being provided with means permitting of the movement of the cut-off valve in a reverse direction from its neutral position without actuating said second indicative means.

3. In combination with an instrument having means for temporarily and permanently indicating the speed of a locomotive and actuating means for the cut-off valve of the locomotive including a reverse lever; a second indicative means correlated with the indicative means of said instrument for temporarily and permanently indicating the various cut-off valve positions during a run of the locomotive, actuating means for said latter indicative means, and means operatively connecting said actuating means to the reverse lever, and effective in the movement of said lever to shift the cut-off valve in one direction from its neutral position, to thereby operate said second indicative means to an extent determined by the speed indicating means whereby the cut-off valve is positioned for the propulsion of the vehicle at a desired speed.

4. In combination with the cut-off valve of a locomotive and actuating means therefor including a reverse lever and a tumbling shaft to which said lever is operatively connected; means for indicating the various positions of said cut-off valve, means for actuating said indicating means in the operation of the reverse lever including two members movable as a unit in one direction, means connecting one of said members to the actuating means for the indicator, means connecting the other of said members to the tumbling shaft whereby upon rotation of said shaft in one direction the indicating means is operated, and upon rotation of said shaft in the reverse direction an independent movement is imparted to the latter member without effecting the operation of the indicator.

5. In combination with the cut-off valve of a locomotive and actuating means therefor including a reverse lever and tumbling shaft and operating connections between said lever and shaft; an instrument having means for indicating different positions of the cut-off wave, a second shaft, a lever fixed at one of its ends to said shaft, means connecting said lever to the tumbling shaft, an arm loosely mounted upon said second named shaft, actuating means for the indicator operatively connected to said arm, a stop lug preventing movement of the arm in one direction relative to said lever, said lever and arm having co-acting means for effecting their unitary movement in a reverse direction, and means connecting the arm and lever and yieldingly resisting independent movement of the latter.

6. In combination with a speed indicating instrument for locomotives having a graduated traveling tape and a marker for producing a speed curve line upon said tape indicative of the speed in miles per unit of time; a second marker co-ordinated with said instrument and means operatively connecting said second marker with the cut-off valve actuating means of the locomotive to graphically produce upon the travelling tape a second line for comparison with the speed curve line and which is indicative of various positions of the cut-off valve.

7. In combination with the cut-off valve of a locomotive, operating gear therefor and a reverse lever operatively connected to said gear; means for indicating the various positions of said cut-off valve, and means for actuating said indicating means in the operation of the reverse lever including means for compensating the operation of the indicator to differences in movement of the cut-off valve with respect to the operating gear.

In testimony that we claim the foregoing as our invention, we have signed our names hereunder.

VIRGINIUS Z. CARACRISTI.
ANTHONY F. WALLBILLICH.